United States Patent [19]

Falk

[11] 4,002,205
[45] Jan. 11, 1977

[54] HORTICULTURAL DEVICE

[76] Inventor: David C. Falk, 4239 Avent Ferry Road, Raleigh, N.C. 27606

[22] Filed: Dec. 5, 1974

[21] Appl. No.: 529,738

[52] U.S. Cl. .................................. 172/15; 172/17; 172/123; 37/94; 37/189; 37/81; 172/548
[51] Int. Cl.² .................. A01D 35/00; A01B 23/02
[58] Field of Search ............... 37/81, 94, 189, 190, 37/94 (U.S. only); 172/15, 17, 13, 16, 123, 548

[56] References Cited

UNITED STATES PATENTS

| 2,664,807 | 1/1954 | Hedrick | 172/15 |
| 2,718,838 | 9/1955 | Schumacher | 172/16 |
| 3,319,365 | 5/1967 | Perry et al. | 37/94 |
| 3,483,929 | 12/1969 | MacIntyre et al. | 37/81 X |

Primary Examiner—George J. Marlo
Attorney, Agent, or Firm—Mills and Coats

[57] ABSTRACT

In abstract, a preferred embodiment of this invention is a device for forming and maintaining demarcation boundaries primarily in the field of plant husbandry. The device includes power driven sets of blades spaced from each other on a common axle, with the tips of the blades angled toward each other. The blades are arranged so that a wedge-shaped trench is cut, and the dirt effectively impelled and scattered.

1 Claim, 8 Drawing Figures

HORTICULTURAL DEVICE

This invention relates to plant husbandry and more particularly to horticultural devices for establishing and maintaining of demarcation boundaries for plant beds.

In the past, many specialized devices have been developed for use in the field of plant husbandry. These horticultural devices have included not only rotor tiller type cultivators, but also devices for trimming lawns along the edges of hard surfaces such as sidewalks, driveways, curbs and the like. None of these devices, however, have been satisfactory for creating and maintaining distinct boundaries between grassy areas and plant cultivated areas such as flower beds.

The rotor tiller type cultivators mentioned above are inadequate for establishing cultivated area boundaries because they do not leave a clear demarcation line, but to the contrary leave a rough, ragged pattern of pulverized earth on either side of their swath. Edging devices, sometime referred to as lawn edgers, are particularly designed for trimming grass from sidewalks, driveways, curbs and the like and generally consist only of a single flat blade for making a fine, clean-cut of the overlying grass. These edging devices do not pulverize the earth, and in fact are specifically designed not to do so since this is considered extremely undesirable in this type of operation.

After much research and study into the above mentioned problems, the present invention has been developed which gives a clean, smooth demarcation boundary along a grassy area while at the same time pulverizing and spreading the earth in the direction toward the cultivated area. This allows a neat, well maintained appearance to be accomplished between the lawn and plant bed without expensive, labor consuming fixed borders being installed as were heretofore believed necessary. This is particularly advantageous in large maintained areas such as the grounds of apartment complexes, country clubs, public parks and the like where flower and other plant beds may be seasonally put in and removed and in any case require long demarcation borders to be established and maintained.

In view of the above, it is an object of the present invention to provide a horticultural device for establishing and maintaining plant bed boundaries.

Another object of the present invention is to provide a horticultural bordering type device capable of establishing a clear demarcation boundary on one side and pulverized, smoothly distributed soil on the other.

Another object of the present invention is to provide a plant bed boundary establishing and maintenance device for operative attachment to a standard rotor tiller type cultivator.

Another object of the present invention is to provide a plant bed boundary establishing and maintenance device for operative attachment to a standard grass trimming type edging device.

Another object of the present invention is to provide a plant bed boundary establishing and maintenance device in the form of a plurality of blades whose rotative path of travel is generally frustroconical in shape.

A further object of the present invention is to provide, in a plant bed boundary establishing and maintenance device, a cutting means in the form of a tapering helical auger.

Other objects and advantages of the present invention will become apparent and obvious from a study of the following description and the accompanying drawings which are merely illustrative of such invention.

IN THE DRAWINGS

With further reference to the drawings, a mobile source of rotative power, indicated generally at 10, such as rotor tiller, lawn grass trimmer or the like is provided. Devices of this type, although they can be electrically or similarly operated, a gasoline engine driven type device appears to be at present more practical because of its mobility and lack of necessity to be connected to a fixed power source. Although the present invention is described and shown relative to gasoline powered type devices, it certainly is not intended to be limited to the same.

On the two types of power sources shown, a frame 11 rotatively mounts wheels 12 which can be either free rotating or power driven.

Figure 1:
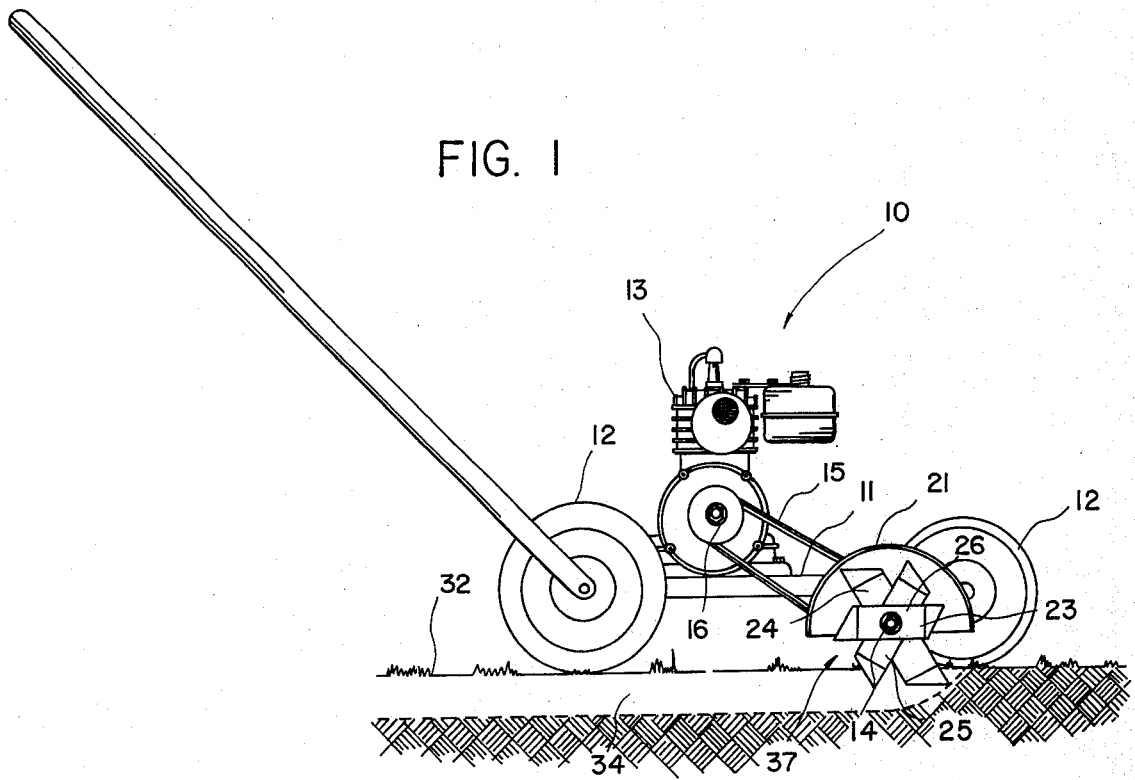
FIG. 1 is a side elevational view of the plant bed boundary establishing and maintenance device of the present invention mounted on a motor driven grass trimmer type lawn edger.
Figure 2:
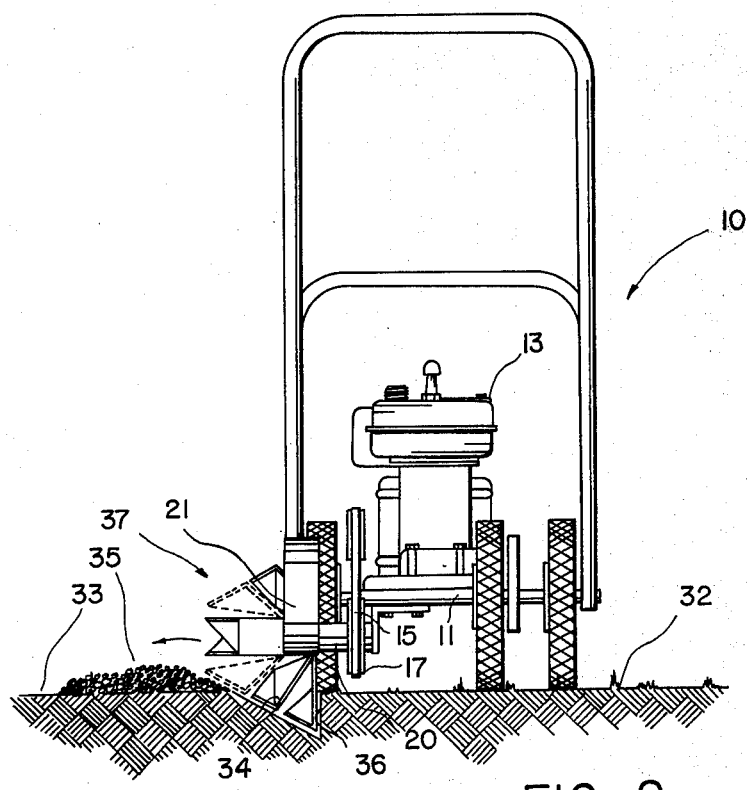
FIG. 2 is a front elevational view of the same.
Figure 3:
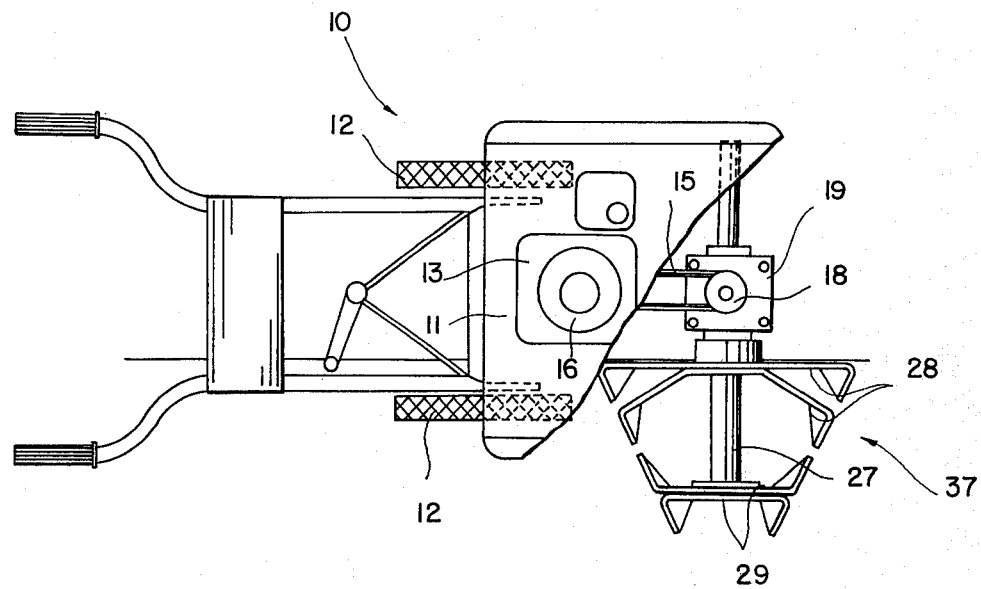
FIG. 3 is a top plan view of an embodiment of the boundary establishing and maintenance device of the present invention operatively mounted on a rotor tiller type cultivating device.

A prime mover such as engine 13 is mounted on frame 11 and is operatively connected to drive shaft 14 by any conventional means such as drive belt 15. This belts extends from the engine drive pulley 16, either directly to drive shaft pulley 17, or to a gear box pulley 18 which converts vertical drive to horizontal drive as seen in FIG. 3. In either case, power is transmitted from the source of rotative torque 13 to the implement mounting shaft 14.

Since numerous types of power sources and associated carriages, either presently available or developable, can be used with the disclosure of the present invention further decision of these is not deemed necessary.

A standard drive shaft housing 20 can have fixedly secured thereto, if desired, a guard such as that indicated at 21. Drive shaft 14 is rotatively mounted within housing 20. A shoulder 22 is provided on shaft 14 and operatively engages the tool of the present invention attached thereto. The end of shaft 14 is threaded and is adapted to receive a tool securing means such as holddown nut 23.

Figure 5:
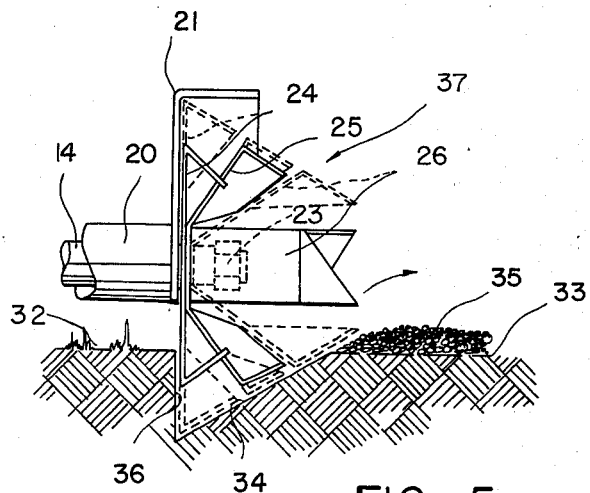
FIG. 5 is a side elevational view of the cutter head of the present invention.
Figure 6:
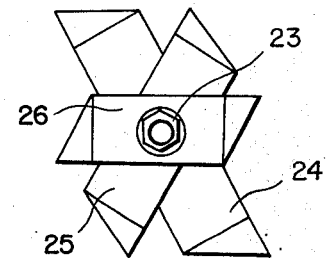
FIG. 6 is an end elevational view of the same.

In the embodiment of FIGS. 5 and 6, a plurality of blades such as the three indicated at 24, 25 and 26 are mounted on shaft 14 and disposed to each other at approximately 120°. These blades are of varying angular configurations as can clearly be seen in FIGS. 5 and 6. The ends of these blades are angled such that as they rapidly rotate, their outer extremities create a frustroconical swath configuration. It should be noted from FIG. 5 that the back blade 24 is generally flat with tips at acute angles, blade 25 is outwardly bent at approximately 45° with its tips at approximately 90°, while the outer or third blade 26 is outwardly disposed at an angle greater than 45° with its tips at an obtuse angle.

Figure 4:
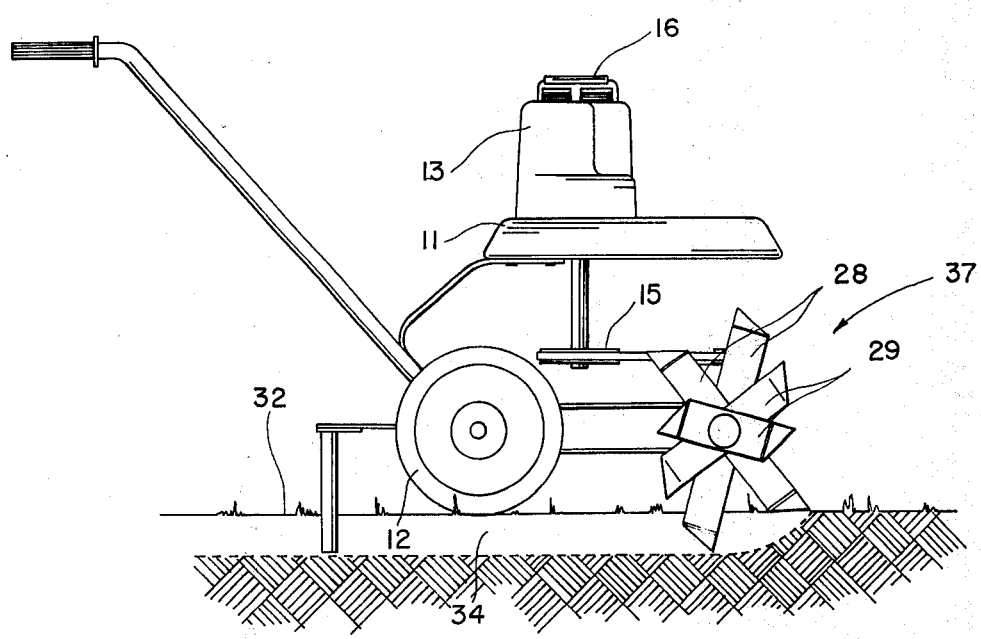
FIG. 4 is a side elevational view of the FIG. 3 version of the present invention showing the frustroconical swath pattern created during operation.

A slightly different blade configuration is shown in FIGS. 3 and 4 wherein a hollow cylindrical sleeve 27 mounts a pair of blades at either end thereof with the outer tips being so disposed that the generally frustroconical swath configuration is formed when the device is in use.

Figure 7:
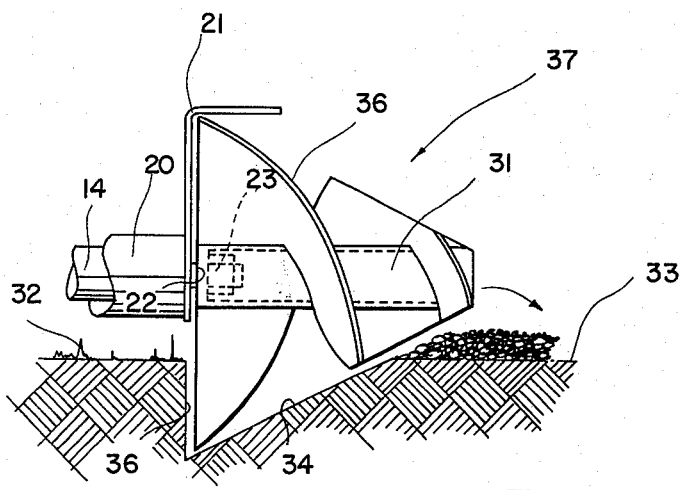
FIG. 7 is a side elevational view of the auger blade version of the present invention.
Figure 8:
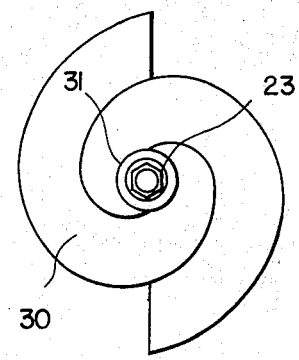
FIG. 8 is an end elevational view of the same.

In a slightly modified version of the horticultural device of the present invention, a helical cutting blade 30 is fixedly secured to cylindrical sleeve 31 as seen clearly in FIGS. 7 and 8. This sleeve is operatively mounted on the end of shaft 14 and held in place by nut 23 as are the blades of the above disclosed embodiments.

In the blade embodiment shown in FIGS. 1-2 and 5-6, it should be noted that the tips of the blades which are bent, are not bent squarely across the end but at an angle. This gives a scoping and impelling effect so that as the border swath is cut, the earth, along with grass and other vegetation, will be pulverized and scatteringly propelled in the direction of the arrows in FIGS. 2 and 6. This pulverized and scattered material from the boundary trench or swath 34 will form a plant beneficial mulch in plant bed 33. Since the pulverized, mulch type material removed from swath 34 is thrown only in the direction of plant bed 33, a clear demarcation between the same and lawn or grass 32 is established. The same wedge-shaped-in-cross-section swath 34 is cut by the embodiment shown in FIGS. 7 and 8 and the dirt and plant matter removed therefrom is scattered across the plant bed 33 in the direction of the arrow in FIG. 7. Since the helical blades 30 in this embodiment will be rotating at a fairly high RPM, a pulverized, mulch like material will be ejected as swath 34 is cut.

In all three embodiments (the two blade versions and the helical version), the path of travel of the fastly rotating blades is in a frustoconical pattern. Thus, it can be seen from the drawings that the border created is generally wedge shaped in cross section. The benefit of this is that the plant bed 33 appears to come all the way to the edge of the lawn or grass 32 from which the plant bed is being demarcated with only a slight downward crown in said plant bed. From this it can be seen that the plant bed can be utilized right up to the demarcation border 36 with no unsightly, unusable portion, and with no permanent or semipermanent boundary that must be trimmed or otherwise cared for.

To actually use the device of the present invention, the border cutting and impelling means 37 of the present invention is operatively installed on any suitable power source 10. The entire unit is then located at the beginning of the boundary to be cut so that the base of the hereinabove referred to frustroconical blade travel path is in line with such intended boundary. The power source 10 is then energized to rotate the cutting unit 37. As the same turns, it is lowered to proper operating depth and then moved along cutting a trench 34 and depositing the mulchified material removed therefrom onto plant bed 33 and leaving a clear demarcation border 36 between such bed and the surrounding area 32. Thus it can be seen that an eye appealing border can be rapidly established at almost no cost and can be readily maintained by infrequent periodic reestablishment through reuse of the present invention.

From the above, it can be seen that the present invention has the advantage of providing a highly efficient means for establishing a demarcation border between a cultivated plant bed type area and its ambient area. This means is inexpensive to manufacture and maintain and yet creates an attractive boundary. Not only is the boundary established, but the soil, plant material and any debris is emulsified and spread over the plant bed type cultivated area. This, of course, eliminates any waste material that ordinarily would have to be removed while accomplishing the desired boundary creating operation.

The present invention may, of course, be carried out in other specific ways than those herein set forth without departing from the spirit and essential characteristics of the invention. The present embodiments are, therefore to be considered in all respects as illustrative and not restrictive and all changes coming within the meaning and equivalency range of the appended claims are intended to be embraced herein.

What is claimed is:

1. A horticultural device for establishing and maintaining the boundary between plant beds and ambient grassy areas comprising: a frame means; a plurality of wheel type means for supporting said frame means relative to a surface of the earth to be transversed; handle means secured to said frame means for user controlling the said horticultural device during traverse; means for causing said supported frame means to traverse said surface; power drive means carried by said frame means for imparting a rotative motion to a shaft means, said shaft being disposed generally parallel to said surface and perpendicular to the direction of traverse; and significantly spaced apart first and second sets of pluralities of elongated earth cutting and scattering blades mounted on one end of said shaft means, each of said sets having outer tips which are so angled that, as such blades rotate with said shaft means, said shaft forms the axis of a generally frustroconical shaped cutting swath, and at least one of the angled tips of each set of blades being disposed toward the other set whereby, as the edge of said cutting swath engages the earth, a wedge-shaped-in-cross-section trench will be cut and the dirt therefrom impelled and scattered toward the small end of said frustrocone thereby establishing a neat, clear-cut eye pleasing demarcation boundary.

* * * * *